US007650435B2

(12) United States Patent
Jones et al.

(10) Patent No.: US 7,650,435 B2
(45) Date of Patent: Jan. 19, 2010

(54) APPARATUS AND METHOD TO INSTALL A COMPONENT IN AN INFORMATION STORAGE AND RETRIEVAL SYSTEM

(75) Inventors: Carl E. Jones, Tucson, AZ (US); Robert A. Kubo, Tucson, AZ (US); Gregg S. Lucas, Tucson, AZ (US); Kenneth R. Schneebeli, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 10/971,806

(22) Filed: Oct. 22, 2004

(65) Prior Publication Data

US 2006/0087923 A1 Apr. 27, 2006

(51) Int. Cl.
*G06F 3/00* (2006.01)
*H02J 7/00* (2006.01)
(52) U.S. Cl. .......................................... 710/1; 307/65
(58) Field of Classification Search ................ 710/2; 307/65
See application file for complete search history.

(56) References Cited

U.S. PATENT DOCUMENTS

| | | | |
|---|---|---|---|
| 4,654,789 A | 3/1987 | Nusinov et al. | |
| 5,579,511 A | 11/1996 | Cavasa et al. | |
| 5,802,365 A | 9/1998 | Kathail et al. | |
| 5,889,965 A * | 3/1999 | Wallach et al. | ............... 710/302 |
| 6,269,423 B1 | 7/2001 | Kishi | |
| 6,272,560 B1 | 8/2001 | Kenton et al. | |
| 2003/0221094 A1 | 11/2003 | Pennarum | |
| 2004/0015949 A1 | 1/2004 | Taylor | |
| 2004/0039561 A1 | 2/2004 | Montano et al. | |

\* cited by examiner

*Primary Examiner*—Henry W. H. Tsai
*Assistant Examiner*—Juanito C Borromeo
(74) *Attorney, Agent, or Firm*—Dale F. Regelman; Quarles & Brady LLP (57) ABSTRACT

A method is disclosed to install a component in an information storage and retrieval system. The method provides an information storage and retrieval system comprising a system processor and system data, and a component comprising persistent component data. The method attaches the component to the information storage and retrieval system while the information storage and retrieval system remains in normal operation, and determines, while the information storage and retrieval system remains in normal operation, if the component is compatible with the information storage and retrieval system. If the component is compatible with the information storage and retrieval system, the method then places the component into service while the information storage and retrieval system remains in normal operation.

18 Claims, 4 Drawing Sheets

APPARATUS AND METHOD TO INSTALL A COMPONENT IN AN INFORMATION STORAGE AND RETRIEVAL SYSTEM

FIELD OF THE INVENTION

This invention relates to an apparatus and method to install a component in an information storage and retrieval system while that information storage and retrieval system remains in normal operation.

BACKGROUND OF THE INVENTION

Data storage and retrieval systems are used to store information provided by one or more host computer systems. Such data storage and retrieval systems receive requests to write information to one or more secondary storage devices, and requests to retrieve information from those one or more secondary storage devices. Upon receipt of a write request, the system stores information received from a host computer in a data cache. In certain implementations, a copy of that information is also stored in a nonvolatile storage device. Upon receipt of a read request, the system recalls information from the one or more secondary storage devices and moves that information to the data cache. Thus, the system is continuously moving information to and from storage devices, and to and from the data cache.

It is desirable for many data processing applications to remain in continuous, or near continuous, operation. Data processing systems, however, require both scheduled and non-scheduled maintenance to, among other things, repair equipment, replace equipment, and/or upgrade equipment. What is needed is an apparatus and method to install a new component in an information storage and retrieval system, verify the compatibility of that new component, and then place that new component in service, all the while keeping the information storage and retrieval system in normal operation.

SUMMARY OF THE INVENTION

Applicant's invention includes an apparatus and method to install a component in an information storage and retrieval system. The method provides an information storage and retrieval system comprising a system processor and system data, and a component comprising persistent component data. The method attaches the component to the information storage and retrieval system while the information storage and retrieval system remains in normal operation, and determines, while the information storage and retrieval system remains in normal operation, if the component is compatible with the information storage and retrieval system. If the component is compatible with the information storage and retrieval system, the method then places the component into service while the information storage and retrieval system remains in normal operation.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which includes two clusters, a plurality of host adapters, a plurality of device adapters, and a data cache. The following description of Applicant's apparatus and method to validate the configuration of an information storage and retrieval system is not meant, however, to limit Applicant's invention to use in an information storage and retrieval system which comprises two clusters, a plurality of host adapters, a plurality of device adapters, and a data cache, as the invention herein can be applied in general to installing a component in an information storage and retrieval systems while that system remains in normal operation.

Figure 1:
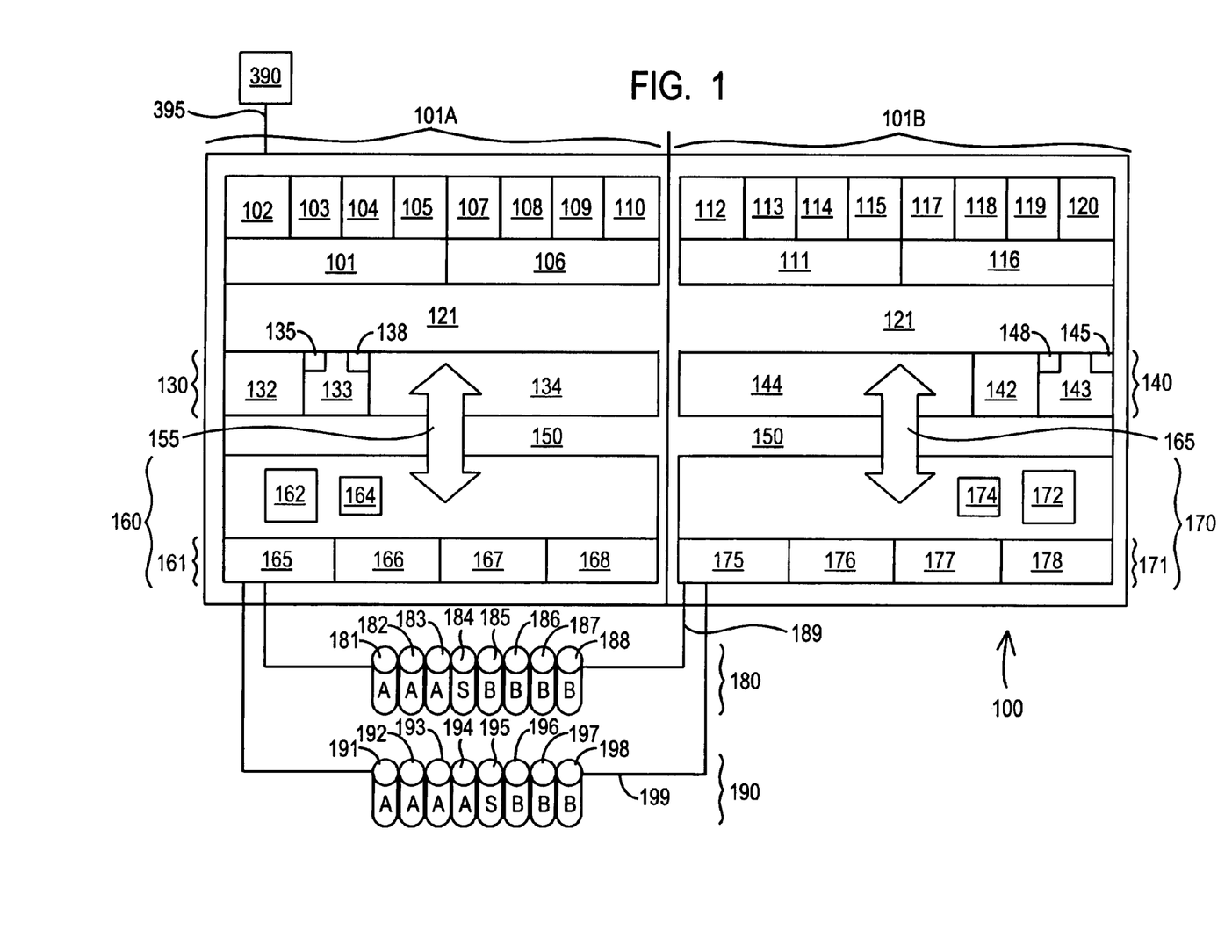
FIG. 1 is a block diagram showing one embodiment of Applicant's data storage and retrieval system.

Referring now to FIG. 1, in certain embodiments Applicant's apparatus and method are embodied in an information storage and retrieval system 100. Information storage and retrieval system 100 is capable of communication with host computer 390 via communication link 395. The illustrated embodiment of FIG. 1 shows a single host computer. In other embodiments, Applicant's information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further includes a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicant's information storage and retrieval system 100 includes a plurality of host adapters 102-105, 107-110, 112-115, and 117-120, disposed in four host bays 101, 106, 111, and 116. In other embodiments, Applicant's information storage and retrieval system includes fewer than 16 host adapters. Regardless of the number of host adapters disposed in any embodiments of Applicant's system, each of those host adapters comprises a shared resource that has equal access to both central processing/cache elements 130 and 140. Each host adapter may comprise one or more Fibre Channel ports, one or more FICON ports, one or more ESCON ports, or one or more SCSI ports. Each host adapter is connected to both clusters through interconnect bus 121 such that each cluster can handle I/O from any host adapter.

Processor portion 130 includes processor 132 and cache 134. In certain embodiments, processor portion 130 further includes memory 133, and system data 135 written to that memory. In certain embodiments, memory device 133 comprises random access memory. In certain embodiments, memory device 133 comprises non-volatile memory, such as for example one or more EEPROMs (Electrically Erasable Programmable Read Only Memory), one or more flash PROMs (Programmable Read Only Memory), battery backup RAM, hard disk drive, combinations thereof, and the like.

Processor portion 140 includes processor 142 and cache 144. In certain embodiments, processor portion 140 further includes memory 143, and system data 145 written to that memory. In certain embodiments, memory device 143 comprises random access memory. In certain embodiments, memory device 143 comprises non-volatile memory, such as for example one or more EEPROMs (Electrically Erasable Programmable Read Only Memory), one or more flash PROMs (Programmable Read Only Memory), battery backup RAM, hard disk drive, combinations thereof, and the like.

I/O portion 160 comprises a plurality of device adapters, such as device adapters 165, 166, 167, and 168. I/O portion 170 further comprises a plurality of device adapters, such as device adapters 175, 176, 177, and 178.

In certain embodiments of Applicant's system, one or more host adapters, processor portion 130, and one or more device adapters, are packaged together on a single card disposed in Applicant's information storage and retrieval system. Similarly, in certain embodiments, one or more host adapters, processor portion 160, and one or more device adapters, are disposed on another card disposed in Applicant's information storage and retrieval system. In these embodiments, Applicant's system 100 includes two cards interconnected with a plurality of data storage devices.

In the illustrated embodiment of FIG. 1, sixteen data storage devices are organized into two arrays, namely array "A" and array "B". The illustrated embodiment of FIG. 1 shows two storage device arrays. In other embodiments, Applicant's information storage and retrieval system includes more than two storage device arrays. Each storage array appears to a host computer as one or more logical devices.

In certain embodiments, one or more of the data storage devices comprise a plurality of hard disk drive units. In the illustrated embodiment of FIG. 1, disk array "A" includes disk drives 181, 182, 183, 191, 192, 193, and 194. Disk array "B" includes disk drives 185, 186, 187, 188, 196, 197, and 198. In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

The illustrated embodiment of FIG. 1 shows two storage device arrays. In other embodiments, Applicant's system includes a single storage device array. In yet other embodiments, Applicant's system includes more than two storage device arrays.

The loop structure shown in FIG. 1 comprises one embodiment of Applicant's system. In other embodiments, link 189 and/or 199 comprises a switched fabric or a combination of a switch and loop topologies. In other embodiments, link 189 and/or 199 comprises dual FC-AL loops of switches. Each loop contains one or more Fibre Channel switches.

In certain embodiments, Applicants' information storage and retrieval system comprises an automated media library comprising a plurality of tape cartridges, one or more robotic accessors, and one or more tape drives. U.S. Pat. No. 5,970,030, assigned to the common assignee herein, describes such an automated media library and is hereby incorporated by reference. In certain embodiments, Applicants' information storage and retrieval system comprises a virtual tape system. U.S. Pat. No. 6,269,423, assigned to the common assignee herein, describes such a virtual tape system, and is hereby incorporated by reference.

As those skilled in the art will appreciate, it is often desirable that a data processing application and/or a data processing center remain in continuous operation, i.e. "24/7/365" operation. On the other hand, over time data processing applications and/or data processing equipment require both scheduled and non-scheduled maintenance. Such maintenance includes, for example, equipment repair, equipment replacement, and/or equipment upgrades. Applicants' invention includes a method to determine the compatibility of a repaired, replaced, and/or upgraded component (collectively an "installed component") while Applicants' information storage and retrieval system remains in normal operation. By "normal operation," Applicants mean that their information storage and retrieval systems remains capable of receiving data requests from one or more host computers, writing data to one or more information storage media, reading data from one or more information storage media, and providing data to one or more host computers.

Figure 2A:
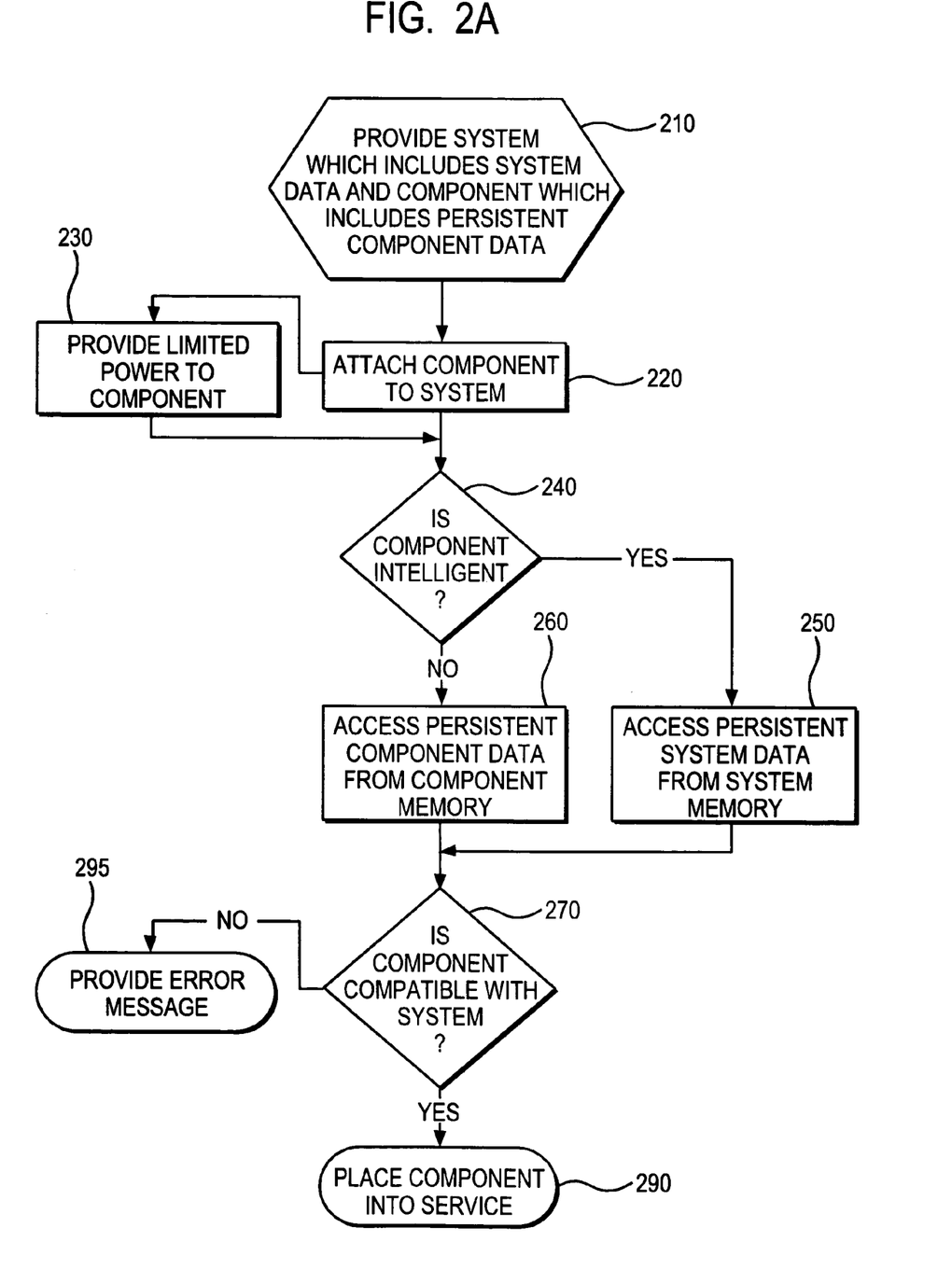
FIG. 2A is a flow chart summarizing the steps of one embodiment of Applicant's method.

FIG. 2A summarizes the steps of one embodiments of Applicants' method. Referring now to FIG. 2A, in step 210 the method provides an information storage and retrieval system that includes system data, such as for example system data 135 or 145, stored in memory, such as for example memory 133 or 143, respectively. In certain embodiments, that memory comprises persistent memory. By "persistent memory," Applicants mean non-volatile memory, i.e. memory that survives a loss of power to the information storage and retrieval system, such as for example one or more EEPROMs (Electrically Erasable Programmable Read Only Memory), one or more flash PROMs (Programmable Read Only Memory), battery backup RAM, hard disk drive, combinations thereof, and the like. Component data stored in such persistent memory comprises persistent component data.

In certain embodiments, system data 135 comprises a lookup table which recites a list of components that are compatible with certain component locations disposed within Applicants' information storage and retrieval system. Such compatibility is a function of, inter alia, the component's form factor and weight, the component's power requirements, the component's data output format, the component's data input format, the component's operating temperature range, and the like. As an example, in certain embodiments such a lookup table recites host adapters by product name and/or identifier and/or part number and/or manufacturer that are compatible with host adapter bay 101 (FIG. 1).

In certain embodiments, the system data of step 210 comprises compatible component parameters, such as without limitation, input power, output power, response times, error recovery procedures, reporting capabilities, memory size, processor type, data storage capability, data storage format, input data format, output data format, size, weight, operating temperature ranges, and the like.

Step 210 further includes providing a component which includes persistent component data. In certain embodiments, that component comprises, without limitation, a data storage device, a cooling device, a power conversion device, a communication device, a robotic accessor, and the like. The component provided in step 210 includes a persistent memory device and persistent component data written to that persistent memory. As described above, by "persistent memory," Applicants mean non-volatile memory such as, for example, one or more EEPROMs (Electrically Erasable Programmable Read Only Memory), one or more flash PROMs (Programmable Read Only Memory), battery backup RAM, hard disk drive, combinations thereof, and the like. By "persistent component data," Applicants mean component data written to such a persistent memory device. By "component data," Applicants mean, for example, product name, product identifier, part number, input power, output power, response times, error recovery procedures, reporting capabilities, memory size, processor type, data storage capability, data storage format, input data format, output data format, size, weight, operating temperature range, storage temperature range, and the like.

Figure 3A:
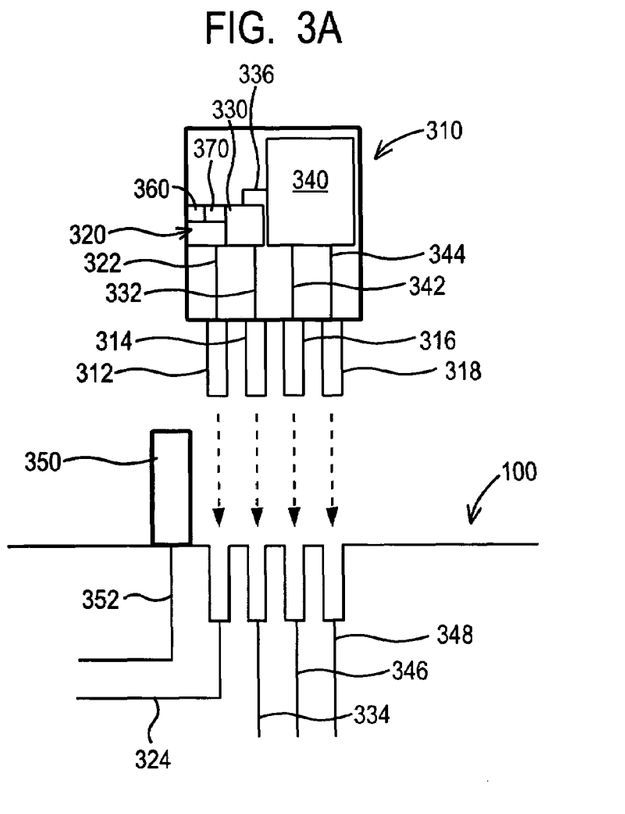
FIG. 3A is a block diagram showing a component being installed in an information storage and retrieval system.

As an example, and without limitation, and referring to FIG. 3A, component 310 comprises a power conversion module which includes persistent memory 320, persistent component data 360 written to memory 320, transformer 340, input power conduit 342, and output power conduit 344. Memory 320 is connected to communication link 322 which is connected to pin 312. Input power conduit 342 is connected to pin 316, and output power conduit 344 is connected to pin 318.

Power conversion module may optionally include processor 330 and microcode 370. Processor 330 is connected to communication link 332 which is connected to pin 314, and communication link 336 which is connected to transformer 340.

Information storage and retrieval system may optionally include memory reading device 350. Memory reading device 350 is interconnected to a processor, such as for example processor 132, by communication link 352.

In step 220, the method attaches the component of step 210 to Applicants' information storage and retrieval system. For example and referring to FIG. 3B, power conversion module 310 is shown attached to information storage and retrieval system 100 such that memory 320 is interconnected with a system processor, such as for example processor 132 via communication links 322 and 324, and such that optional processor 330 receives power from system 100 via power conduits 332 and 334, and such that transformer 340 receives input power via input power conduits 342 and 346, and such that transformer 340 provides output power to system 100 via output power conduits 344 and 348. In embodiments that include memory reading device 350, the component, such as component 310, is attached to Applicants' information storage and retrieval system such that the memory reading device, such as device 350, is capable of reading the persistent component data, such as persistent component data 360, from the component's memory device, such as memory device 320.

In certain embodiments, step 220 includes attaching the component to the system using attachment means such as adhesive bonding, mechanical attachment, and the like. In certain embodiments, step 220 includes releaseably attaching the component to the system.

In certain embodiments, step 220 is performed by a service technician, system operator, and the like. In certain embodiments, step 220 is performed by a robotic device, such as without limitation as robotic accessor. U.S. Pat. No. 5,970,030, assigned to the common assignee herein, describes such robotic accessors and depicts such robotic accessors in FIGS. 1 and 2, and those Figures are hereby incorporated herein by reference.

In certain embodiments, Applicants' method transitions from step 220 to step 230 wherein the method provides first power to the component attached in step 220. By "first power," Applicants mean providing only enough power to allow the method to access the persistent component data stored in the component, and/or only enough power for the method to determine if the component comprises an intelligent device. In certain embodiments, step 230 is performed by a processor, such as for example processor 132 (FIG. 1), disposed in Applicants' information storage and retrieval system 100 (FIG. 1).

For example and referring again to FIG. 3B, in embodiments that do not include memory reading device 350, before supplying input power comprising a first voltage and a first amperage to power conversion module 310 via input power conduit 346, Applicants' information storage and retrieval system provides only first power to processor 330 via power conduits 332 and 334.

In certain embodiments, step 230 is performed by a processor, such as for example processor 132 (FIG. 1), or processor 142 (FIG. 1), disposed in Applicants' information storage and retrieval system 100 (FIG. 1). Applicants' method transitions from step 230 to step 240.

Figure 3B:
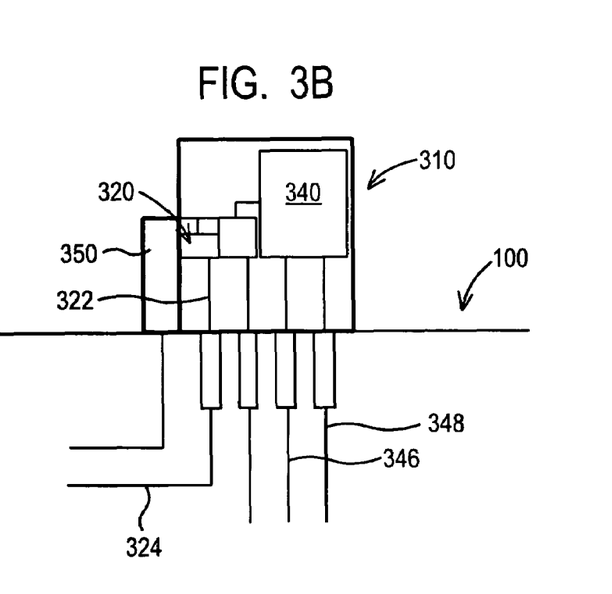
FIG. 3B is a block diagram showing the installed component of FIG. 3A.

In certain embodiments, Applicants' information storage and retrieval system includes one or more memory reading devices, such as memory reading device 350 (FIGS. 3A, 3B). In certain of these embodiments, the component provided in step 210, such as for example power conversion module 310, is attached to Applicants' system, such as for example system 100, in step 220 such that persistent memory device 320 is disposed adjacent memory reading device 350. Further in these embodiments, persistent component data is passed from the component to the adjacent memory reading device using a contactless interface. In certain embodiments, such a contactless interface comprises a contactless radio frequency interface. In certain embodiments, this radio frequency interface provides first power to the component to access the persistent component data disposed in the component's persistent memory.

In certain embodiments, the component's persistent memory comprises an electronic storage medium. By "electronic storage medium," Applicants mean, for example, a device such as a PROM, EPROM, EEPROM, Flash PROM, compactflash, smartmedia, and the like. In certain of these embodiments, persistent memory device 320 comprises, for example, an EEPROM containing 4,096 bytes organized as 128 32-byte accessible blocks. In these embodiments, memory reading device 350 generates an operating field. This operating field supplies first power to the EEPROM, and is modulated by both the EEPROM and the memory reading device to enable contactless communication between the component 310 and memory reading device 350.

In one embodiment, the operating field comprises a carrier frequency of about 13,560 kHz±7 kHz. The minimum field strength is about 5 A/m and the maximum field strength is about 15 A/m. Applicants' memory reading device 350 (FIGS. 3A, 3B) communicates with EEPROM 320 (FIGS. 3A, 3B) by amplitude modulating this operating field. The EEPROM communicates with the memory reading device by load modulating the operating field with a subcarrier having a subcarrier frequency equal to the carrier frequency divided by 16, i.e. fc/16. As those skilled in the art will appreciate, load modulation is the process of amplitude modulating a radio frequency field by varying the properties of a resonant circuit placed within the radio frequency field. In Applicants' contactless communication embodiments, Applicants' method transitions from step 220 to step 240.

In step 240, Applicants' method determines if the component provided in step 210 and attached in step 220 comprises an intelligent device. By "intelligent device," Applicants mean that the device includes a processor, memory, and microcode. In certain embodiments, step 240 is performed by a processor, such as for example processor 132 (FIG. 1), disposed in Applicants' information storage and retrieval system 100 (FIG. 1).

If Applicants' method determines in step 240 that the component provided in step 210, attached in step 220, and optionally provided with first power in step 230, comprises an intelligent device, then Applicants' method transitions from step 240 to step 250 wherein the newly-attached intelligent device accesses system data, such as for example system data 135 (FIG. 1). In certain embodiments, step 250 is performed by a processor, such as for example processor 330 (FIGS. 3A, 3B), disposed in the newly-attached component, such as for example component 310 (FIGS. 3A, 3B). Applicants' method transitions from step 250 to step 270.

Alternatively, if Applicants' method determines in step 240 that the component provided in step 210, attached in step 220, and optionally provided with first power in step 230, does not comprise an intelligent device, then Applicants' method transitions from step 240 to step 260 wherein a processor disposed in Applicants' information storage and retrieval system, such as for example processor 132 (FIG. 1) and/or processor 142 (FIG. 1), accesses persistent component data, such as for example persistent component data 360 (FIG. 3), from a non-volatile memory device, such as non-volatile memory 320 (FIG. 3), disposed in the newly-installed component, such as for example component 310 (FIG. 3).

In certain of these embodiments, step 260 includes reading the persistent component data, such as component data 360 (FIG. 3), using "hard wired" interconnection(s), such as for example communication links 322 and 324 shown in FIG. 3. In other embodiments, step 260 includes reading the persistent component data using a wireless communication link, i.e. reading persistent component data 360 (FIG. 3) using memory reading device 350 (FIG. 3).

Applicants' method transitions from step 260 to step 270 wherein the method determines if the newly-installed component is compatible with Applicants' information storage and retrieval system. In embodiments wherein Applicants' method transitions from step 250 to step 270, i.e. the component provided in step 210 and attached in step 220 comprises an intelligent device, step 270 is performed by a processor disposed within that intelligent device. Alternatively, in embodiments wherein Applicants' method transitions from step 260 to step 270, then step 270 is performed by a processor, such as processor 132 (FIG. 1), disposed within Applicants' information storage and retrieval system, such as for example system 100 (FIG. 1).

For example and without limitation and again referring to FIG. 3B, in step 270 processor 330 determines, among other things, if the input power provided by system 100 via input power conduit 346 is compatible with the input power requirements of transformer 340, and if the output power provided by transformer 340 is compatible with the load attached to output power conduit 348. In this example, step 270 may also include, for example, determining if the ambient temperature experienced by module 310 is within that module's operating temperature limits.

If Applicants' method determines in step 270 that the newly-installed component is not compatible with Applicants' information storage and retrieval system, then the method does not place that newly-installed component in service. Rather Applicants' method transitions from step 270 to step 295 wherein the method provides an error message. In certain embodiments, step 295 is performed by a system processor, such as for example system processor 132. In other embodiments, step 295 is performed by a component processor, such as for example component processor 330.

Alternatively, if Applicants' method determines in step 270 that the newly-installed component is compatible with Applicants' information storage and retrieval system, then the method transitions from step 270 to step 290 wherein Applicants' method places in full service the component provided in step 210, attached in step 220, and optionally partially powered in step 230. In certain embodiments, step 290 includes providing full power to that newly-installed component. In certain embodiments, step 290 is performed by a system processor, such as for example processor 132 (FIG. 1). In certain embodiments, step 290 is performed by a component processor, such as for example processor 330 (FIG. 3A).

For example and referring again to FIG. 3B, if Applicants' method determines in step 270 that the input power provided to module 310 is compatible with the input power limits of transformer 340, and the output power provided to system 100 by transformer 340 is compatible with the load on power conduit 348, then in step 290 Applicants' information storage and retrieval system places power conversion module 310 into service, and provides input power to module 310.

Figure 2B:
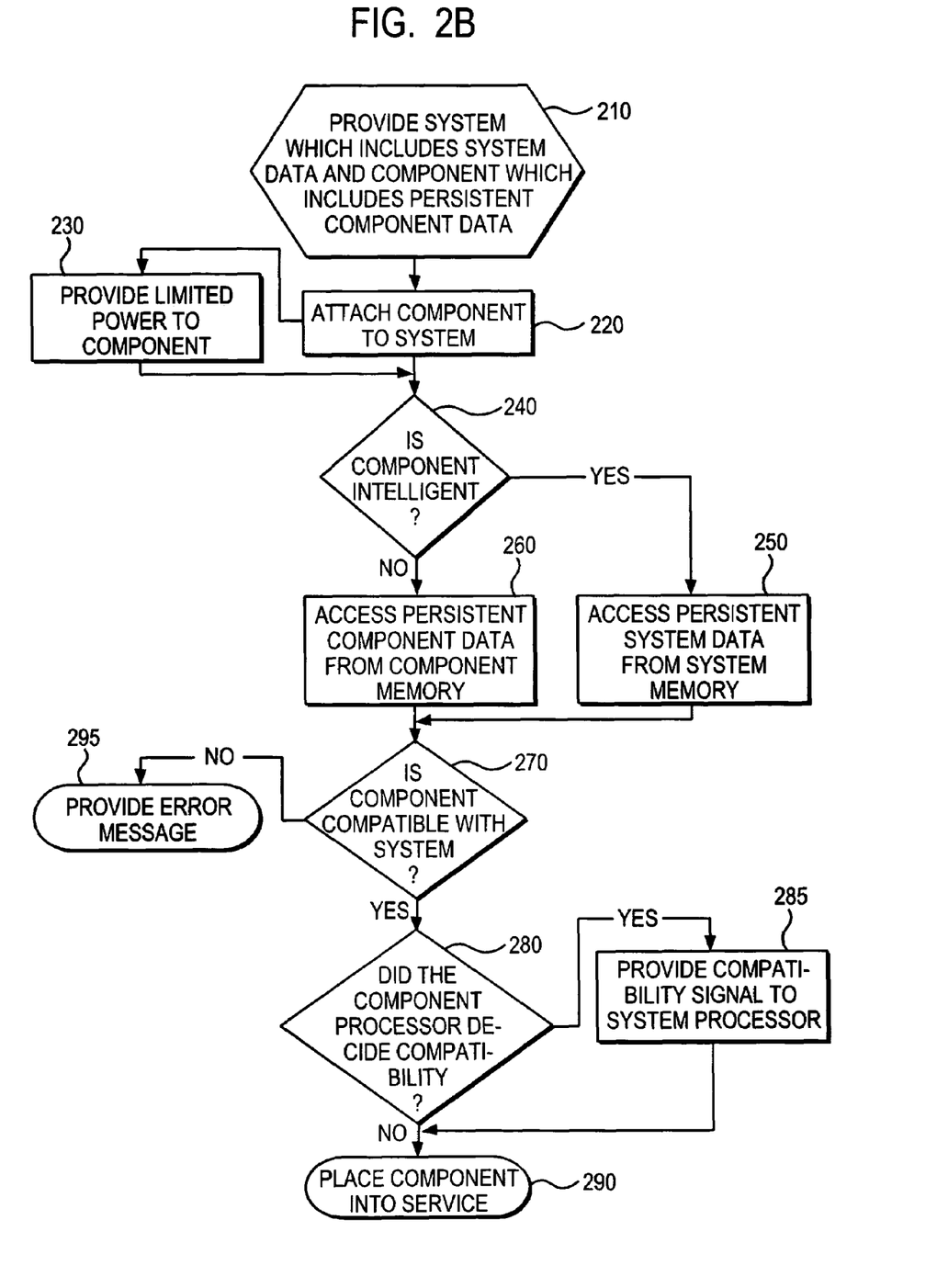
FIG. 2B is a flow chart summarizing the steps of a second embodiment of Applicant's method.

FIG. 2B summarizes the steps of a second embodiment of Applicants' method. Referring now to FIG. 2B, steps 210, 220, 230, 240, 250, 260, 270, 290, and 295, are described above. In this embodiment, if Applicants' method determines in step 270 that the newly-installed component is compatible with Applicants' information storage and retrieval system, then the method transitions from step 270 to step 280 wherein the method determines if the compatibility determination of step 270 was performed by a system processor or a component processor. In certain embodiments, step 280 is performed by a system processor, such as for example system processor 132. In other embodiments, step 280 is performed by a component processor, such as for example component processor 330.

If Applicants' method determines in step 280 that the system processor performed the compatibility decision of step 270, then the method transitions from step 280 to step 290 wherein a system processor, such as for example processor 132, places in full service the component provided in step 210, attached in step 220, and optionally partially powered in step 230. In certain embodiments, step 290 includes providing full power to that newly-installed component.

If the method determines in step 280 that the component compatibility decision of step 270 was performed by a component processor, then the method transitions from step 280 to step 285 wherein the method provides a compatibility signal to the system processor. The reporting of step 285 may comprise any signaling method known to those of skill in the art. In certain embodiments, the component processor provides a compatibility signal to the system processor. In other embodiments the system processor polls the component processor to ascertain the compatibility decision of step 270. Applicants' method transitions from step 285 to step 290 wherein a system processor, such as for example processor 132, places in full service the component provided in step 210, attached in step 220, and optionally partially powered in step 230. In certain embodiments, step 290 includes providing full power to that newly-installed component.

In certain embodiments, Applicant's invention includes instructions, such as instructions 138 (FIG. 1) and/or 148 (FIG. 1), where those instructions are executed by processor 132 (FIG. 1) and/or 142 (FIG. 1) to perform steps 230, 240, 260, 270, 290, and 295, recited in FIG. 2A, and/or to perform steps 230, 240, 260, 270, 280, 285, 290, and 295, recited in FIG. 2B.

In other embodiments, Applicant's invention includes instructions residing in any other computer program product, where those instructions are executed by a computer external to, or internal to, Applicants' information storage and retrieval system, to perform steps 230, 240, 260, 270, 290, and 295, recited in FIG. 2A, and/or to perform steps 230, 240, 260, 270, 280, 285, 290, and 295, recited in FIG. 2B. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to install a component in an information storage and retrieval system, comprising the steps of:
   providing an information storage and retrieval system comprising a system processor and system data;
   providing a component, wherein said component comprises a power conversion module comprising memory and persistent component data written to said memory, wherein said persistent component data comprises an input power, an output power, and an operating temperature range;
   attaching said component to said information storage and retrieval system while said information storage and retrieval system remains in normal operation;
   reading said persistent component data;
   determining using said persistent component data and while said information storage and retrieval system remains in normal operation, if said component is compatible with said information storage and retrieval system;
   operative if said component is compatible with said information storage and retrieval system, placing said component into service while said information storage and retrieval system remains in normal operation;
   providing first power to said component prior to performing said determining compatibility step; and
   providing full power to said component if said component is compatible with said information storage and retrieval system, wherein said full power is greater than said first power.

2. The method of claim 1, wherein said determining step and said placing in service step are performed by said system processor.

3. The method of claim 1, wherein said providing a component step further comprises providing a component which includes a component processor; and
   wherein said determining step and said placing in service step are performed by said component processor.

4. The method of claim 1, further comprising the steps of:
   determining if said component comprises a component processor;
   operative if said component comprises a component processor:
   performing said determining compatibility step by said component processor;
   providing a compatibility signal by said component processor to said system processor.

5. The method of claim 1, further comprising the steps of:
   providing an information storage and retrieval system comprising a memory reading device;
   attaching said component to said information storage and retrieval system such that said persistent component data can be read by said memory reading device;
   reading said persistent component data using said memory reading device.

6. The method of claim 5, wherein said providing a component step further comprises providing a component comprising an electronic storage medium.

7. An article of manufacture comprising a system processor, system data, and a computer useable medium having computer readable program code disposed therein to determine the compatibility of an installed component comprising a power conversion module comprising memory and persistent component data written to said memory, wherein said persistent component data comprises an input power, an output power, and an operating temperature range, the computer readable program code comprising a series of computer readable program steps to effect:
   reading said persistent component data;
   determining using said persistent component data and while said article of manufacture remains in normal operation, if said component is compatible with said article of manufacture;
   operative if said component is compatible with said article of manufacture, placing said component into service while said article of manufacture remains in normal operation;
   providing first power to said component prior to determining the compatibility of said component;
   providing full power to said component if said component is compatible with said information storage and retrieval system, wherein said full power is greater than said first power.

8. The article of manufacture of claim 7, the computer readable program code comprising a series of computer readable program steps to effect if said component is not compatible with said article of manufacture, providing an error message.

9. The article of manufacture of claim 7, the computer readable program code comprising a series of computer readable program steps to effect determining if said component comprises a component processor.

10. The article of manufacture of claim 9, the computer readable program code comprising a series of computer readable program steps to effect receiving a compatibility signal from said component processor.

11. The article of manufacture of claim 7, wherein said article of manufacture comprises a memory reading device, the computer readable program code comprising a series of computer readable program steps to effect reading said persistent component data using said memory reading device.

12. The article of manufacture of claim 11, wherein said component comprises an electronic storage medium.

13. A computer program product encoded in an information storage medium and usable with a programmable computer processor to determine the compatibility of a component comprising a power conversion module comprising memory and persistent component data comprising an input power, an output power, and an operating temperature range, written to said memory, installed in an information storage and retrieval system comprising a system processor and system data, comprising:

computer readable program code which causes said programmable computer processor to read said persistent component data;

computer readable program code which causes said programmable computer processor to determine using said persistent component data and while said information storage and retrieval system remains in normal operation, if said component is compatible with said information storage and retrieval system;

computer readable program code which, if said component is compatible with said information storage and retrieval system, causes said programmable computer processor to place said component into service while said information storage and retrieval system remains in normal operation     computer readable program code which causes said programmable computer processor to provide first power to said component prior to determining the compatibility of said component;

computer readable program code which causes said programmable computer processor to provide full power to said component if said component is compatible with said information storage and retrieval system, wherein said full power is greater than said first power.

14. The computer program product of claim 13, further comprising computer readable program code which, if said component is not compatible with said information storage and retrieval system, causes said programmable computer processor to provide an error message while said information storage and retrieval system remains in normal operation.

15. The computer program product of claim 13, further comprising computer readable program code which causes said programmable computer processor to determine if said component comprises a component processor.

16. The computer program product of claim 15, further comprising computer readable program code which, if said component comprises a component processor, causes said programmable computer processor to receive a compatibility signal from said component processor.

17. The computer program product of claim 13, wherein said information storage and retrieval system comprises a memory reading device, further comprising computer readable program code which causes said programmable computer processor to read said persistent component data using said memory reading device.

18. The computer program product of claim 17, wherein said component comprises an electronic storage medium.

\* \* \* \* \*

UNITED STATES PATENT AND TRADEMARK OFFICE
CERTIFICATE OF CORRECTION

PATENT NO.         : 7,650,435 B2                                        Page 1 of 1
APPLICATION NO. : 10/971806
DATED              : January 19, 2010
INVENTOR(S)        : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1282 days.

Signed and Sealed this

Twenty-third Day of November, 2010

David J. Kappos
*Director of the United States Patent and Trademark Office*